US012541162B2

(12) United States Patent
Nishimura

(10) Patent No.: US 12,541,162 B2
(45) Date of Patent: Feb. 3, 2026

(54) IMAGE FORMING APPARATUS INCLUDING FIXING DEVICE AND CONTROLLER FOR DRIVING FIXING DEVICE, INCLUDING HEATING PROCESS TO RAISE TEMPERATURE OF HEATING UNIT OF FIXING DEVICE

(71) Applicant: BROTHER KOGYO KABUSHIKI KAISHA, Nagoya (JP)

(72) Inventor: Takuya Nishimura, Nukata (JP)

(73) Assignee: BROTHER KOGYO KABUSHIKI KAISHA, Nagoya (JP)

( * ) Notice: Subject to any disclaimer, the term of this patent is extended or adjusted under 35 U.S.C. 154(b) by 0 days.

(21) Appl. No.: 18/924,746

(22) Filed: Oct. 23, 2024

(65) Prior Publication Data

US 2025/0147454 A1 May 8, 2025

(30) Foreign Application Priority Data

Nov. 6, 2023 (JP) ................................ 2023-189332

(51) Int. Cl.
*G03G 15/20* (2006.01)

(52) U.S. Cl.
CPC ....... *G03G 15/205* (2013.01); *G03G 15/2039* (2013.01)

(58) Field of Classification Search
CPC ............. G03G 15/2039; G03G 15/205; G03G 15/2064; H05B 1/0241
USPC ................................ 399/44, 69, 70; 219/216
See application file for complete search history.

(56) References Cited

U.S. PATENT DOCUMENTS

2003/0235423 A1* 12/2003 Ota ...................... G03G 15/205 399/70
2007/0212083 A1* 9/2007 Ishikuro ............ G03G 15/5008 399/167
2011/0229180 A1* 9/2011 Saito ................. G03G 15/5004 399/69
2013/0272732 A1* 10/2013 Sato .................. G03G 15/2039 399/69
2015/0093136 A1* 4/2015 Koda ................ G03G 15/2039 399/68
2019/0079435 A1* 3/2019 Tamada .............. G03G 15/205
2022/0043374 A1* 2/2022 Otsuka ................ G03G 15/205

FOREIGN PATENT DOCUMENTS

JP 2000-338799 A 12/2000

* cited by examiner

*Primary Examiner* — Robert B Beatty
(74) *Attorney, Agent, or Firm* — Merchant & Gould P.C.

(57) ABSTRACT

An image forming apparatus includes a fixing device, a motor, and a controller. The fixing device includes a heating unit and a first temperature sensor. The controller is configured to perform driving the fixing device. The driving includes a heating process. The controller is further configured to perform, during the heating process: a first control operation in which the controller rotates the motor at a first rotational speed and adjusts a duty cycle of electric power suppled to a heater of the heating unit to a higher value as a deviation between a target temperature and a temperature detected by the first temperature sensor becomes greater; and a second control operation in which the controller rotates the motor at a second rotational speed lower than the first rotational speed and restricts the duty cycle within a range lower than or equal to a restricted value.

10 Claims, 6 Drawing Sheets

| | | TEMPERATURE OF HEATING UNIT | |
|---|---|---|---|
| | | LOWER THAN THIRD THRESHOLD | THIRD THRESHOLD OR HIGHER |
| AMBIENT TEMPERATURE | FIRST THRESHOLD OR LOWER | SECOND CONTROL OPERATION<br>·MOTOR HALF SPEED<br>·DUTY CYCLE RESTRICTION IN EFFECT | FOURTH CONTROL OPERATION<br>·MOTOR HALF SPEED<br>·NO DUTY CYCLE RESTRICTION |
| | HIGHER THAN FIRST THRESHOLD | FIRST CONTROL OPERATION<br>·MOTOR FULL SPEED<br>·NO DUTY CYCLE RESTRICTION | FIRST CONTROL OPERATION<br>·MOTOR FULL SPEED<br>·NO DUTY CYCLE RESTRICTION |

FIG. 3

| | | TEMPERATURE OF HEATING UNIT | |
|---|---|---|---|
| | | LOWER THAN THIRD THRESHOLD | THIRD THRESHOLD OR HIGHER |
| AMBIENT TEMPERATURE | FIRST THRESHOLD OR LOWER | SECOND CONTROL OPERATION<br>・MOTOR HALF SPEED<br>・DUTY CYCLE RESTRICTION IN EFFECT | FOURTH CONTROL OPERATION<br>・MOTOR HALF SPEED<br>・NO DUTY CYCLE RESTRICTION |
| | HIGHER THAN FIRST THRESHOLD | FIRST CONTROL OPERATION<br>・MOTOR FULL SPEED<br>・NO DUTY CYCLE RESTRICTION | FIRST CONTROL OPERATION<br>・MOTOR FULL SPEED<br>・NO DUTY CYCLE RESTRICTION |

IMAGE FORMING APPARATUS INCLUDING FIXING DEVICE AND CONTROLLER FOR DRIVING FIXING DEVICE, INCLUDING HEATING PROCESS TO RAISE TEMPERATURE OF HEATING UNIT OF FIXING DEVICE

REFERENCE TO RELATED APPLICATIONS

This application claims priority from Japanese Patent Application No. 2023-189332 filed on Nov. 6, 2023. The entire content of the priority application is incorporated herein by reference.

BACKGROUND ART

A conventionally known image forming apparatus includes an endless belt whose inner surface is coated with grease, a heater arranged inside the belt loop, a pressure roller that, in cooperation with the heater, nips the belt between the pressure roller and the heater, a motor that drives the pressure roller, and a control unit that controls the motor. When beginning rotating the pressure roller while the image forming apparatus is in a low-temperature environment, the control unit sets the rotational speed of the motor lower than the rotational speed used for printing. This control suppresses the motor from becoming out of step due to grease solidification in a low-temperature environment.

SUMMARY

However, the conventional technology does not consider control for the heater when rotation of the pressure roller is started. In a fixing device in which a belt is nipped between a heater and a pressure roller, the portion of the belt contacting the heater is heated intensively. Therefore, when the control unit begins driving the fixing device in a low-temperature environment, temperature distribution of the belt along the circumferential direction thereof may be irregular, resulting in belt deformation and abnormal noise.

In view of the foregoing, it is an object of the present disclosure to provide an image forming apparatus that includes a fixing device in which a belt is nipped between a heater and a pressure roller and that can suppress the generation of abnormal noise caused by belt deformation.

In order to attain the above and other objects, the present disclosure provides an image forming apparatus including a fixing device, a motor, a second temperature sensor, and a controller. The fixing device includes a heating unit, an endless belt, a pressure roller, and a first temperature sensor. The heating unit includes a heater. The pressure roller is configured to, in cooperation with the heating unit, nip the endless belt between the pressure roller and the heating unit. The first temperature sensor is configured to detect a temperature of the heating unit. The motor is for rotating the pressure roller. The second temperature sensor is different from the first temperature sensor. The controller is configured to perform driving the fixing device. The driving the fixing device includes a heating process to raise the temperature of the heating unit to a target temperature. The controller is further configured to perform a first control operation and a second control operation during the heating process. In the first control operation, the controller rotates the motor at a first rotational speed and adjusts a duty cycle of electric power suppled to the heater to a higher value as a deviation between the target temperature and a temperature detected by the first temperature sensor becomes greater. In the second control operation, the controller rotates the motor at a second rotational speed lower than the first rotational speed and restricts the duty cycle within a range lower than or equal to a restricted value. The restricted value is lower than an upper limit of the duty cycle in the first control operation. The controller is further configured to perform the second control operation when a temperature detected by the second temperature sensor at a start of the driving the fixing device is lower than or equal to a first threshold.

In the above structure, the controller is configured to perform the second control operation when the second detected temperature detected at the start of driving the fixing device is lower than or equal to the first threshold. Thus, under a low-temperature environment, output of the heater is restricted and the motor rotates at a low speed, thereby suppressing an irregular distribution of temperature along the circumferential direction of the belt. As a result, the belt can be suppressed from deforming, and accordingly, abnormal noise can be suppressed from occurring. Moreover, because the belt circulates at a low speed in this case, the occurrence of abnormal noise can be better suppressed than when the belt is circulated at a high speed.

BRIEF DESCRIPTION OF DRAWINGS

FIG. 3 is a view illustrating a table used for selecting a control operation based on both an ambient temperature and a temperature of a heating unit.

DESCRIPTION

Figure 1:
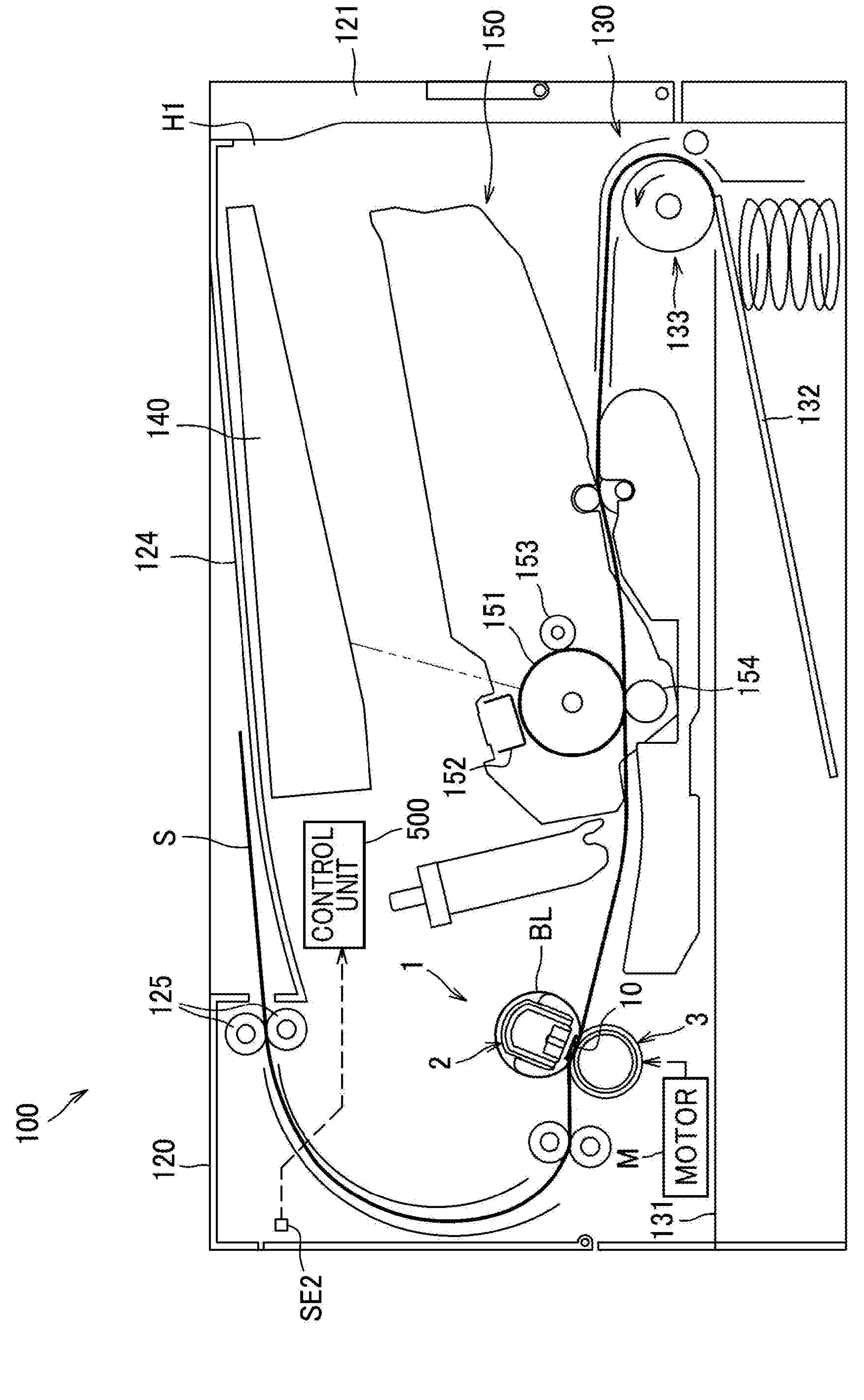
FIG. 1 is a schematic diagram illustrating the structure of a laser printer.

Next, an embodiment of the present disclosure will be described while referring to the accompanying drawings. FIG. 1 shows a laser printer 100 as an example of the image forming apparatus. The laser printer 100 includes a main body housing 120, a feeding unit 130, an exposure device 140, a process cartridge 150, a fixing device 1, a motor M, a second temperature sensor SE2, and a control unit 500.

The main body housing 120 has an opening H1, and includes a front cover 121, and a discharge tray 124. The opening H1 is an opening through which the process cartridge 150 can pass. The front cover 121 is configured to open and close the opening H1. The discharge tray 124 is a tray for supporting sheets S discharged from the main body housing 120.

The feeding unit 130 is a mechanism configured to supply sheets S toward a photosensitive drum 151 described later. The feeding unit 130 includes a feed tray 131, a pressing plate 132, and a feeding mechanism 133. The feed tray 131 is a tray for storing sheets S. The pressing plate 132 is configured to push the sheets S in the feed tray 131 upward toward the feeding mechanism 133. The feeding mechanism 133 is configured to separate the sheets S and feeds the sheets S one at a time to the process cartridge 150.

While not shown in the drawings, the exposure device 140 includes a laser light source, a polygon mirror, lenses, reflecting mirrors, and the like. The exposure device 140 is configured to expose the surface of the photosensitive drum 151 with laser light emitted from the light source based on image data.

The process cartridge 150 is attachable to and detachable from the main body housing 120 through the opening H1. The process cartridge 150 includes the photosensitive drum 151, a charger 152, a developing roller 153, and a transfer roller 154.

The charger 152 is configured to charge the surface of the photosensitive drum 151. The exposure device 140 exposes the charged surface of the photosensitive drum 151 to laser light, thereby forming an electrostatic latent image on the surface of the photosensitive drum 151.

The developing roller 153 is configured to supply toner in the process cartridge 150 to the electrostatic latent image on the photosensitive drum 151, thereby forming a toner image on the photosensitive drum 151. As a sheet S fed by the feeding unit 130 subsequently passes between the photosensitive drum 151 and the transfer roller 154, the toner image on the photosensitive drum 151 is transferred onto the sheet S.

The fixing device 1 is a device configured to fix a toner image to a sheet S. The fixing device 1 includes a heating unit 2, a belt BL, and a pressure roller 3.

The heating unit 2 includes a heater 10. The heater 10 is configured to heat the belt BL in order to heat the sheet S through the belt BL.

The belt BL is formed in an endless loop. That is, the belt BL is an endless belt. The heating unit 2 is disposed inside the loop formed by the belt BL. The pressure roller 3 is configured to, in cooperation with the heating unit 2, nip the belt BL between the pressure roller 3 and the heating unit 2. In the present embodiment, the pressure roller 3 is configured to press the belt BL against the heating unit 2.

A toner image transferred onto a sheet S is fixed to the sheet S as the sheet S passes between the belt BL and the pressure roller 3. After the toner image is fixed to the sheet S, discharge rollers 125 discharge the sheet S onto the discharge tray 124.

The motor M is a motor for rotating the pressure roller 3. The control unit 500 controls the motor M.

The second temperature sensor SE2 is a sensor configured to detect the ambient temperature of the laser printer 100 (i.e., the air temperature outside the laser printer 100). The second temperature sensor SE2 is disposed in a space within the main body housing 120 where the temperature is approximately equivalent to the ambient temperature (i.e., the air temperature outside the laser printer 100). For example, the second temperature sensor SE2 may be positioned near an air intake port provided for drawing outside air into the main body housing 120.

The second temperature sensor SE2 is configured to output the detected temperature to the control unit 500. In the following description, the temperature detected by the second temperature sensor SE2 will be sometimes called the "second detected temperature."

Figure 2A:
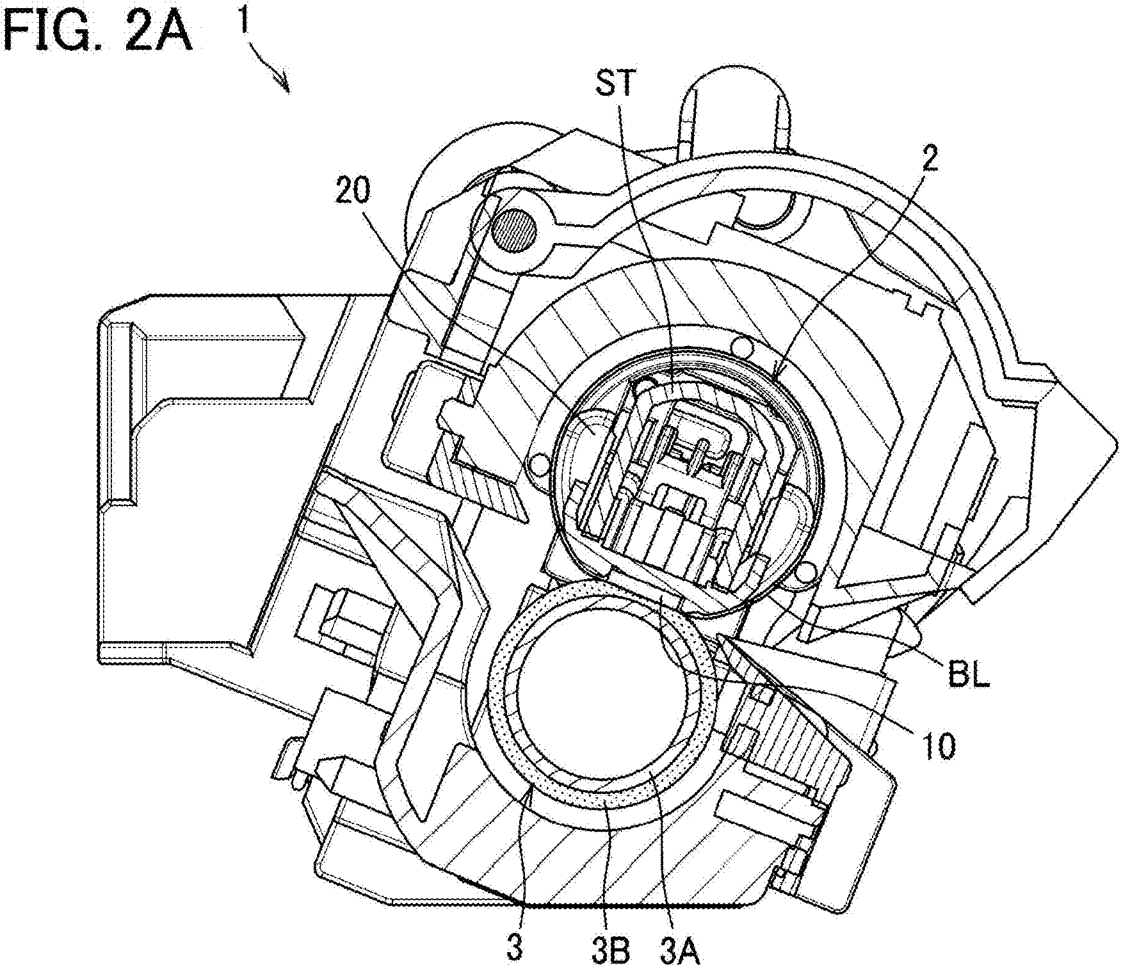
FIG. 2A is a cross-sectional view of a fixing device.

As shown in FIG. 2A, the pressure roller 3 includes a columnar shaft 3A, and a cylindrical roller portion 3B. The shaft 3A is made of metal, for example. The roller portion 3B is made of rubber, for example. The roller portion 3B covers a portion of the shaft 3A.

Figure 2B:
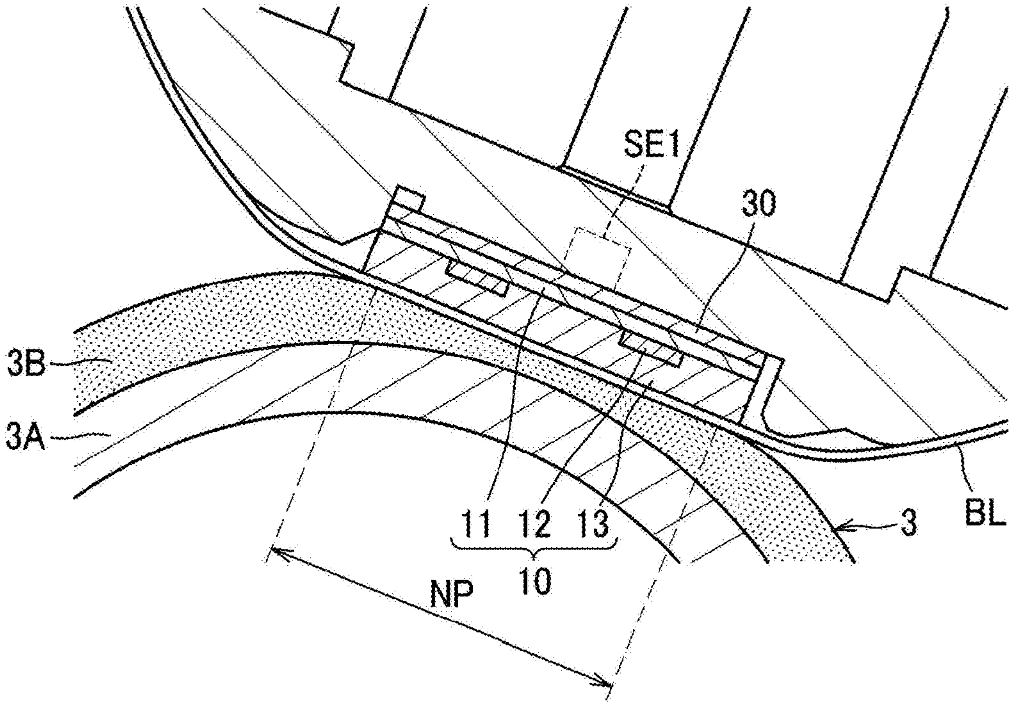
FIG. 2B is an enlarged cross-sectional view of a heater of the fixing device and the adjacent area of the heater.

In addition to the heater 10, the heating unit 2 includes a holder 20, a stay ST, a thermally conductive member 30 (see, FIG. 2B), and a first temperature sensor SE1 (see, FIG. 2B).

The first temperature sensor SE1 is a different sensor from the second temperature sensor SE2. The first temperature sensor SE1 is configured to detect the temperature of the heating unit 2, and specifically the temperature of the heater 10. The first temperature sensor SE1 is in contact with the thermally conductive member 30. The first temperature sensor SE1 is configured to output the detected temperature to the control unit 500. In the following description, the temperature detected by the first temperature sensor SE1 will be sometimes called the "first detected temperature."

As shown in FIG. 2B, the heater 10 and the pressure roller 3 form a nip portion NP by nipping the belt BL between the heater 10 and the pressure roller 3. The heater 10 includes a substrate 11, resistance heating elements 12 arranged on the substrate 11, and a cover 13. The substrate 11 is an elongated rectangular ceramic plate formed of aluminum oxide (alumina). The heater 10 is known as a ceramic heater.

The resistance heating elements 12 are formed on one surface of the substrate 11 by printing. The resistance heating elements 12 generate heat when energized, i.e., when supplied with electric power.

The cover 13 covers the resistance heating elements 12. The cover 13 is formed of glass, for example.

As shown in FIG. 2A, the holder 20 supports the heater 10. The holder 20 also functions to guide the belt BL. The holder 20 is formed of a resin, for example.

The stay ST supports the holder 20. The stay ST is formed of metal, for example.

The belt BL is formed of metal, resin, or the like. The belt BL is configured to circulate around the heater 10 while guided by the holder 20. The belt BL has an outer circumferential surface and an inner circumferential surface. The outer circumferential surface of the belt BL contacts the pressure roller 3 or a sheet S to be heated. The inner circumferential surface of the belt BL contacts the heater 10. The inner circumferential surface is coated with grease.

The thermally conductive member 30 is a member for conducting heat along the longitudinal direction of the heater 10 in order to ensure a uniform temperature throughout the longitudinal dimension of the heater 10. The thermally conductive member 30 is a plate-shaped member. The thermally conductive member 30 is positioned between the heater 10 and the holder 20 and is in contact with the other surface of the substrate 11. The thermally conductive member 30 is nipped between the heater 10 and the holder 20 when a sheet S is nipped between the heating unit 2 and pressure roller 3. The thermally conductive member 30 is formed of aluminum, for example.

The control unit 500 includes a CPU, ROM, RAM, and nonvolatile memory and is configured to execute various processes based on a prepared program. During the process of raising the temperature of the heating unit 2 to a target temperature (e.g., during a first heating process described below, or during a second heating process described below), the control unit 500 is configured to select and perform a first control operation, a second control operation, a third control operation, and a fourth control operation as appropriate. The target temperature is set to a fixing temperature Tt suitable for fixing a toner image when executing a print mode and is set to a ready temperature Tr when executing a ready mode. The ready temperature Tr is lower than the fixing temperature Tt. The control unit 500 is an example of the controller.

The first control operation is a control operation in which the control unit 500 rotates the motor M at a first rotational speed and adjusts (sets) the duty cycle of electric power supplied to the heater 10 (i.e., the duty cycle for energizing the heater 10) to a higher value as the deviation between the first detected temperature and the target temperature becomes greater. This temperature deviation is calculated by subtracting the first detected temperature from the target temperature, for example. In the present embodiment, the first rotational speed is the maximum speed of the motor M, which will simply be called "full speed." During the first control operation, the control unit 500 sets the duty cycle within the range 0%-100%. That is, in the present embodiment, the upper limit of the duty cycle in the first control operation is 100%.

The second control operation is a control operation in which the control unit 500 rotates the motor M at a second rotational speed lower than the first rotational speed and restricts the duty cycle of electric power supplied to the heater 10 within a range lower than or equal to a restricted value. The restricted value is lower than the upper limit of the duty cycle in the first control operation. In the present embodiment, the second rotational speed is half of the full speed and will simply be referred to as "half speed." In the second control operation of this embodiment, the control unit 500 fixes the duty cycle at the restricted value. However, in the second control operation, the control unit 500 may adjust or change the duty cycle within a range that does not exceed the restricted value. The restricted value just needs to be a value smaller than 100%. For example, the restricted value may be 33%, i.e., approximately one-third of the upper limit.

The third control operation is a control operation in which the control unit 500 supplies electric power to the heater 10 (i.e., energizes the heater 10) while the motor M is in a halted state (while maintaining the motor M in a halted state). In the third control operation of the present embodiment, the control unit 500 fixes the duty cycle at 100%.

The fourth control operation is a control operation in which the control unit 500 rotates the motor M at the second rotational speed and adjusts (sets) the duty cycle of electric power supplied to the heater 10 to a higher value as the deviation between the first detected temperature and the target temperature becomes greater. In other words, the fourth control operation is similar to the first control operation in the control method of the heater 10 and differs from the first control operation only in how the motor M is controlled. In the fourth control operation, the control unit 500 sets the duty cycle within the range of 0% to 100%.

The control unit 500 performs the third control operation when beginning to drive the fixing device 1. In other words, the control unit 500 starts the third control operation at the start of driving the fixing device 1. After ending the third control operation, the control unit 500 changes to the first, second, or fourth control operation based on the ambient temperature and the temperature of the heating unit 2. Specifically, the control unit 500 selects and starts one of the first, second, and fourth control operations based on the table shown in FIG. 3.

As shown in the table of FIG. 3, the control unit 500 performs the second control operation when the second detected temperature (the ambient temperature) detected at the start of driving the fixing device 1 is lower than or equal to a first threshold TH1 and the first detected temperature (the temperature of the heating unit 2) detected at the start of driving the fixing device 1 is lower than a third threshold TH3.

The control unit 500 performs the fourth control operation when the second detected temperature detected at the start of driving the fixing device 1 is lower than or equal to the first threshold TH1 and the first detected temperature detected at the start of driving the fixing device 1 is higher than or equal to the third threshold TH3.

The control unit 500 performs the first control operation when the second detected temperature detected at the start of driving the fixing device 1 is higher than the first threshold TH1, regardless of the temperature of the heating unit 2. When performing the first control operation following the third control operation, the control unit 500 performs neither the second control operation nor the fourth control operation.

When performing either the second control operation or the fourth control operation, the control unit 500 ends execution of the second control operation or execution of the fourth control operation, as the case may be, based on the temperature of the heating unit 2 and subsequently performs the first control operation. Specifically, the control unit 500 switches from the second control operation to the first control operation when the first detected temperature detected during the second control operation becomes greater than or equal to a second threshold TH2. The second threshold TH2 is lower than the target temperature. The control unit 500 also switches from the fourth control operation to the first control operation when the first detected temperature detected during the fourth control operation becomes greater than or equal to the second threshold TH2.

The control unit 500 starts driving the fixing device 1 in response to the power to the laser printer 100 being turned on, in response to the status of the laser printer 100 shifting (transitioning) from the sleep mode to the ready mode, in response to the laser printer 100 (the control unit 500) receiving print data, or in response to the status of the laser printer 100 returning from an error condition to a normal condition. Specifically, in the present embodiment, the control unit 500 starts driving the fixing device 1 immediately upon the occurrence of any one of the four events described above. However, the timings for starting driving the fixing device 1 are not limited to these timings. Alternatively, the control unit 500 may start driving the fixing device 1 after a prescribed period of time has elapsed since the occurrence of any one of the four events. That is, the occurrence of each of the four events just needs to serve as a trigger for the control unit 500 to start driving the fixing device 1. Note that, in addition to the four events, or alternatively in place of one or more of the four events, the occurrences of one or more other events may also be employed as a trigger for starting driving the fixing device 1.

More specifically, when the power to the laser printer 100 is switched from off to on or when the status of the laser printer 100 shifts from the sleep mode to the ready mode, the control unit 500 begins the ready mode and begins driving the fixing device 1, i.e., the control unit 500 starts driving the fixing device 1 in the ready mode. The driving of the fixing device 1 in the ready mode includes the second heating process shown in FIG. 5. In the present embodiment, the control unit 500 first performs the second heating process in the driving of the fixing device 1 in the ready mode (i.e., the driving of the fixing device 1 in the ready mode starts with the second heating process).

Note that a transition from the sleep mode to the ready mode may occur when the time required to receive print data is greater than or equal to a prescribed time, such as when the volume of print data is large. In this case, the control unit 500 determines whether all print data is received within the prescribed time from the start of reception. The control unit 500 transitions from the sleep mode to the print mode when determining that reception of all print data is completed within the prescribed time from the start of the reception. The control unit 500 transitions from the sleep mode to the ready mode when determining that reception is not completed within the prescribed time from the start of the reception. During the sleep mode, the control unit 500 halts the motor M and turns off the heater 10.

Figure 4:
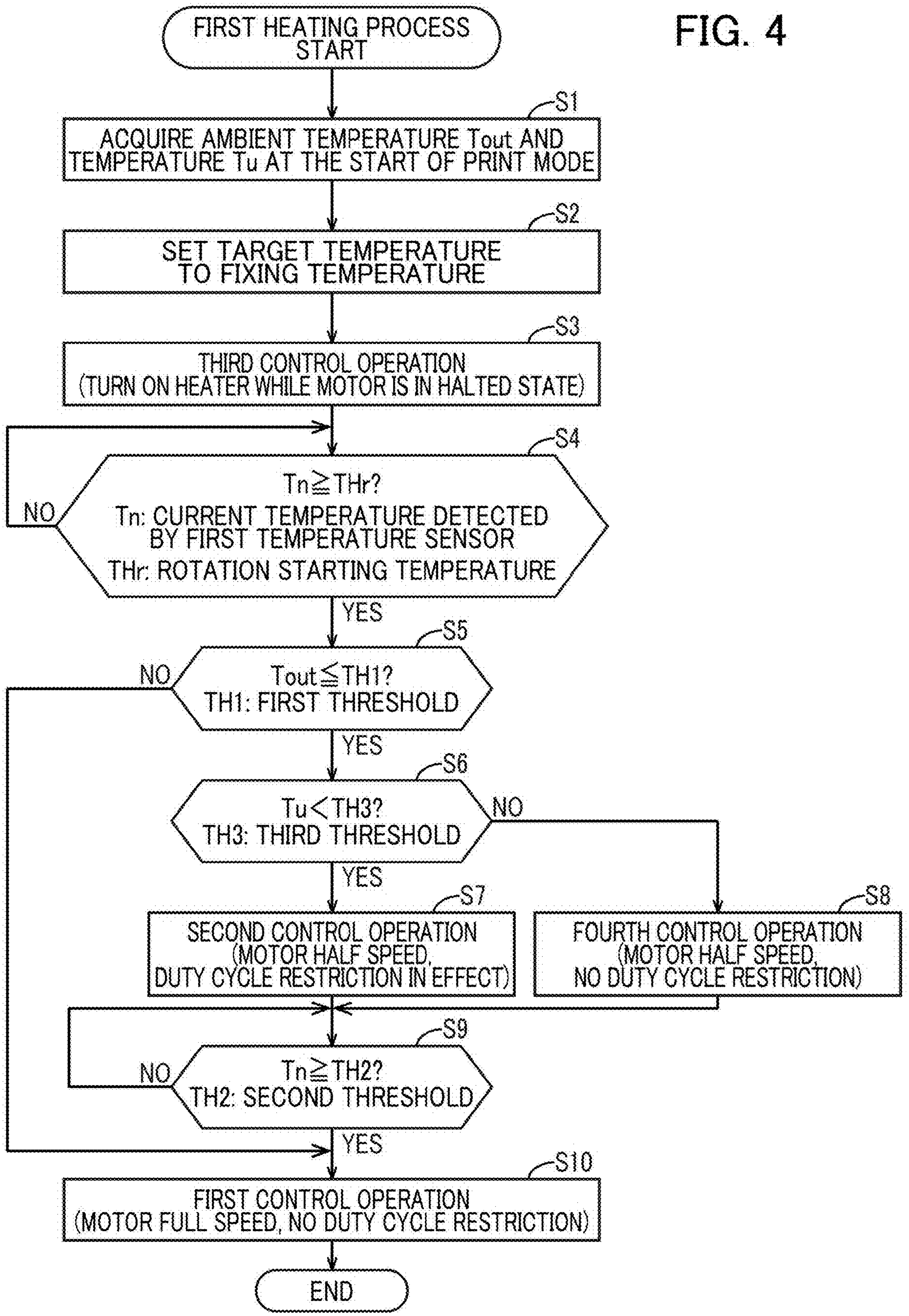
FIG. 4 is a flowchart of a first heating process.

When the laser printer 100 (the control unit 500) has received print data, the control unit 500 starts the print mode and starts driving the fixing device 1, i.e., the control unit 500 starts driving the fixing device 1 in the print mode. When the status of the fixing device 1 changes to an error condition during the print mode and then returns from an error condition to the normal condition, the control unit 500 resumes the print mode and starts driving the fixing device 1, i.e., the control unit 500 starts driving the fixing device 1 in the print mode. The driving of the fixing device 1 in the print mode includes the first heating process shown in FIG. 4. In the present embodiment, the control unit 500 first performs the first heating process in the driving of the fixing device 1 in the print mode (i.e., the driving of the fixing device 1 in the print mode starts with the first heating process).

An error described herein may be any type of error. For example, the control unit 500 determines whether a sheet S has become jammed in the main body housing 120 during printing based on information from sheet sensors that detect the passage of sheets S. When determining that a sheet S has become jammed, the control unit 500 determines that an error occurred, and halts print control.

Thereafter, the control unit 500 determines whether the laser printer 100 has returned from the error condition to the normal condition based on information from a cover sensor and information from the sheet sensors. The cover sensor is configured to detect the opening and closing of the front cover 121. Specifically, the control unit 500 determines that the laser printer 100 has returned from the error condition to the normal condition when determining that a sheet S is not contacting a sheet sensor based on information from the sheet sensors and that the front cover 121 has been closed based on information from the cover sensor.

Next, the control method of the control unit 500 will be described in greater detail. When the control unit 500 receives print data or when the status of the laser printer 100 has recovered from an error condition, the control unit 500 starts driving the fixing device 1 and performs the first heating process shown in FIG. 4 until the first detected temperature has reached the target temperature. The first heating process is an example of the heating process.

In S1 at the beginning of the first heating process, the control unit 500 acquires an ambient temperature Tout from the second temperature sensor SE2 and acquires a temperature Tu from the first temperature sensor SE1. The ambient temperature Tout in the first heating process is the ambient temperature detected at the start of driving the fixing device 1 in the print mode (i.e., at the start of the pint mode.) The temperature Tu in the first heating process is the temperature of the heating unit 2 detected at the start of driving the fixing device 1 in the print mode (i.e., at the start of the print mode). In S2 the control unit 500 then sets the target temperature to the fixing temperature Tt (see FIGS. 6A and 6B).

In S3 the control unit 500 performs the third control operation, and specifically turns on the heater 10 while the motor M is in a halted state. In S4 the control unit 500 determines whether a current temperature Tn of the heating unit 2 acquired from the first temperature sensor SE1 is greater than or equal to a rotation starting temperature THr (see FIGS. 6A and 6B).

The rotation starting temperature THr serves as the threshold value for starting to rotate the motor M. In other words, the rotation starting temperature THr is the threshold value for ending the third control operation. The rotation starting temperature THr is set to a lower temperature than the second threshold TH2.

While the end condition for the third control operation is set based on temperature in this embodiment, the end condition may be set based on time instead. For example, the control unit 500 may end the third control operation once a predetermined time has elapsed since the beginning of the third control operation.

The control unit 500 repeats the process in step S4 while the current temperature Tn is lower than the rotation starting temperature THr (S4: NO). In other words, the control unit 500 repeats the process in step S4 until the current temperature Tn becomes greater than or equal to the rotation starting temperature THr. When the control unit 500 determines that the current temperature Tn becomes greater than or equal to the rotation starting temperature THr (S4: YES), in S5 the control unit 500 determines whether the ambient temperature Tout acquired in S1 (the ambient temperature detected at the start of the print mode) is lower than or equal to the first threshold TH1.

When the control unit 500 determines that the ambient temperature Tout is lower than or equal to the first threshold TH1 (S5: YES), in S6 the control unit 500 determines whether the temperature Tu acquired in S1 (the temperature of the heating unit 2 detected at the start of the print mode) is lower than the third threshold TH3. When the control unit 500 determines in S6 that the temperature Tu is lower than the third threshold TH3 (S6: YES), in S7 the control unit 500 performs the second control operation, and specifically rotates the motor M at half speed while restricting the duty cycle to the restricted value or lower.

On the other hand, when the control unit 500 determines in S6 that the temperature Tu is not lower than the third threshold TH3 (S6: NO), in S8 the control unit 500 performs the fourth control operation, and specifically rotates the motor M at half speed while adjusting the duty cycle within the range 0%-100% based on the deviation between the first detected temperature (the current temperature Tn) and the target temperature.

Following step S7 or step S8, in S9 the control unit 500 determines whether the current temperature Tn of the heating unit 2 is greater than or equal to the second threshold TH2. The control unit 500 repeats the process in step S9 while the current temperature Tn is lower than the second threshold TH2 (S9: NO). In other words, the control unit 500 repeats the process in step S9 until the current temperature Tn becomes greater than or equal to the second threshold TH2.

When the control unit 500 determines in step S9 that the current temperature Tn becomes greater than or equal to the second threshold TH2 (S9: YES) or when the control unit 500 determines in step S5 that the ambient temperature Tout acquired in S1 is higher than the first threshold TH1 (S5: NO), in S10 the control unit 500 performs the first control operation, and specifically rotates the motor M at full speed while adjusting the duty cycle within the range 0%-100% based on the deviation between the first detected temperature (the current temperature Tn) and the target temperature.

The control unit 500 ends this first heating process when the first detected temperature has reached the target temperature under the first control operation. After the first detected temperature has reached the target temperature, the control unit 500 may perform the same control process as a conventional method.

Figure 5:
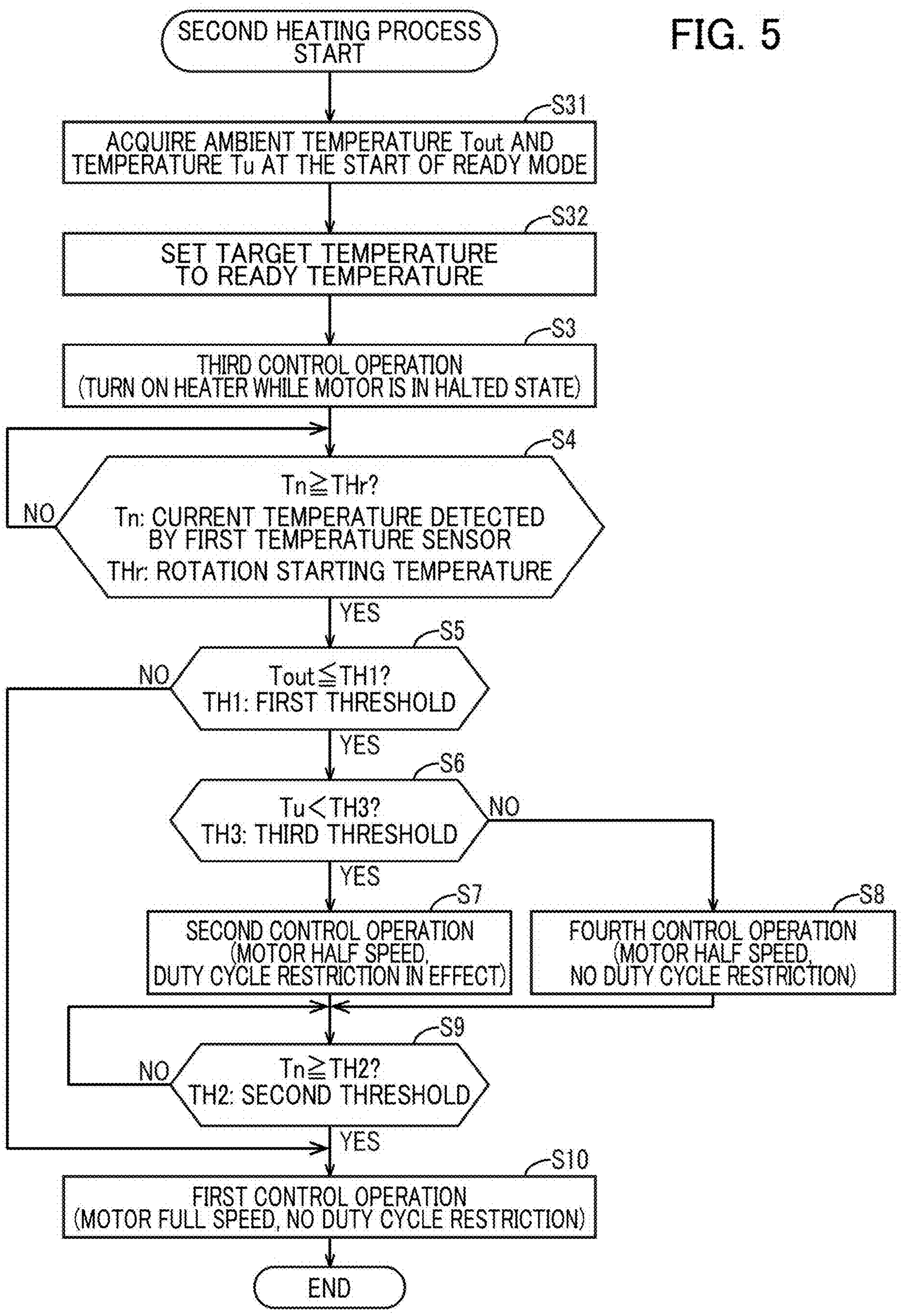
FIG. 5 is a flowchart of a second heating process.

When the power to the laser printer 100 is switched from off to on or when the status of the laser printer 100 has shifted from the sleep mode to the ready mode, the control unit 500 starts driving the fixing device 1 and performs the second heating process shown in FIG. 5 until the first detected temperature has reached the target temperature. The second heating process is also an example of the heating process.

The second heating process in the present embodiment differs from the first heating process only slightly in steps S1 and S2 and is identical to the first heating process in all other steps. Therefore, steps in the second heating process that are identical to those in the first heating process have been designated with the same step numbers, and a description of these steps has been omitted.

In S31 at the beginning of the second heating process, the control unit 500 acquires the ambient temperature Tout from the second temperature sensor SE2 and acquires the temperature Tu of the heating unit 2 from the first temperature sensor SE1. The ambient temperature Tout in the second heating process is the ambient temperature detected at the start of driving the fixing device 1 in the ready mode (i.e., at the start of the ready mode). The temperature Tu in the second heating process is the temperature of the heating unit 2 detected at the start of driving the fixing device 1 in the ready mode (i.e., at the start of the ready mode). In S32 the control unit 500 sets the target temperature to the ready temperature Tr (see FIGS. 6A and 6B). After completing step S32, the control unit 500 performs the same steps S3-S10 described in the first heating process.

Figure 6A:
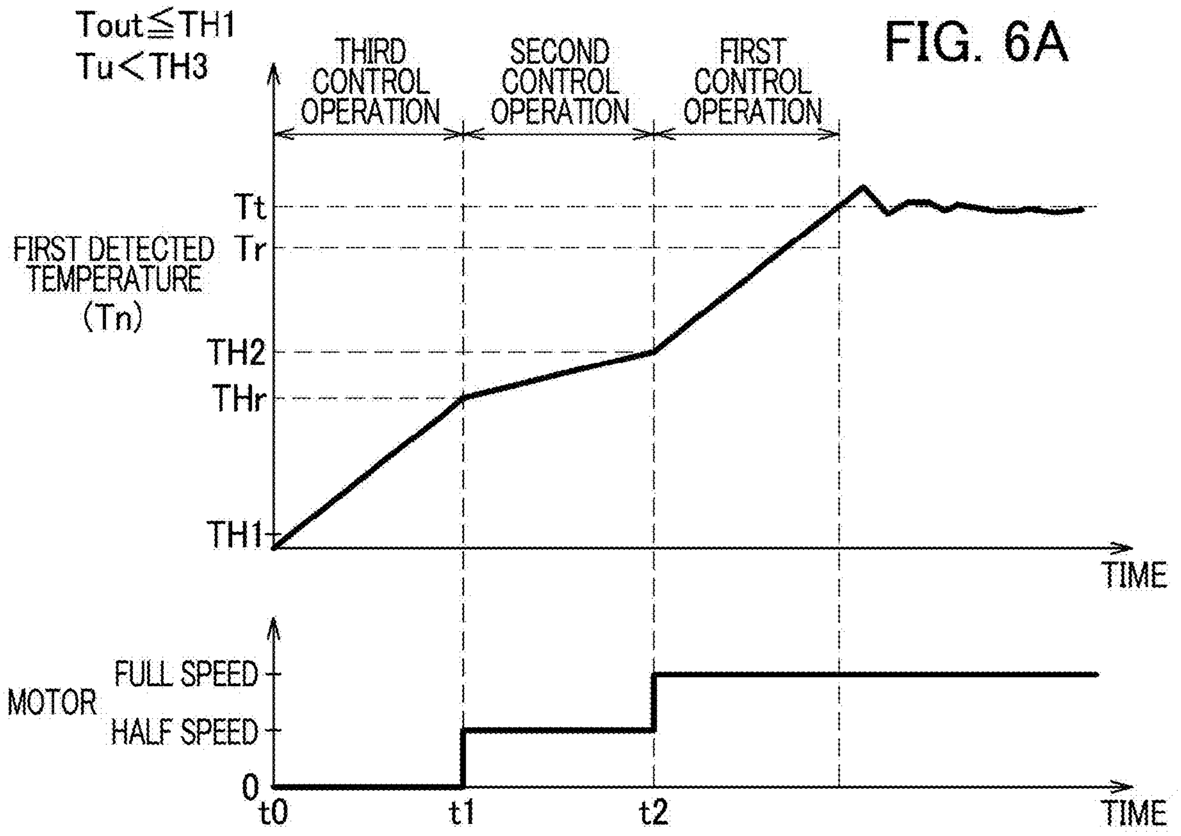
FIG. 6A is a graph illustrating the change in a first detected temperature over time until the first detected temperature has reached a target temperature, and specifically illustrating a case in which the ambient temperature at the start of driving the fixing device is lower than and equal to a first threshold and the temperature of the heating unit at the start of driving the fixing device is lower than a third threshold.

Next, specific examples of operations performed by the control unit 500 will be described. As shown in FIG. 6A, when the control unit 500 receives print data while the ambient temperature Tout is lower than or equal to the first threshold TH1 and the temperature Tu of the heating unit 2 is lower than the third threshold TH3 (timing t0), the control unit 500 first performs the third control operation, and specifically turns on the heater 10 while the motor M is in a halted state (interval between timings t0 and t1). As a result, the first detected temperature (Tn) rises at a first slope, which is relatively steep.

When the first detected temperature (Tn) becomes greater than or equal to the rotation starting temperature THr (timing t1), the control unit 500 switches from the third control operation to the second control operation. In the second control operation, the control unit 500 rotates the motor M at half speed while restricting the duty cycle within a range lower than or equal to the restricted value. As a result, the first detected temperature (Tn) rises at a second slope, which is gentler than the first slope.

When the first detected temperature (Tn) becomes greater than or equal to the second threshold TH2 (timing t2), the control unit 500 switches from the second control operation to the first control operation. In the first control operation, the control unit 500 rotates the motor M at full speed while adjusting the duty cycle within the range of 0% to 100% based on the deviation between the first detected temperature (Tn) and the target temperature. As a result, the first detected temperature (Tn) rises at a steeper slope than the second slope.

Figure 6B:
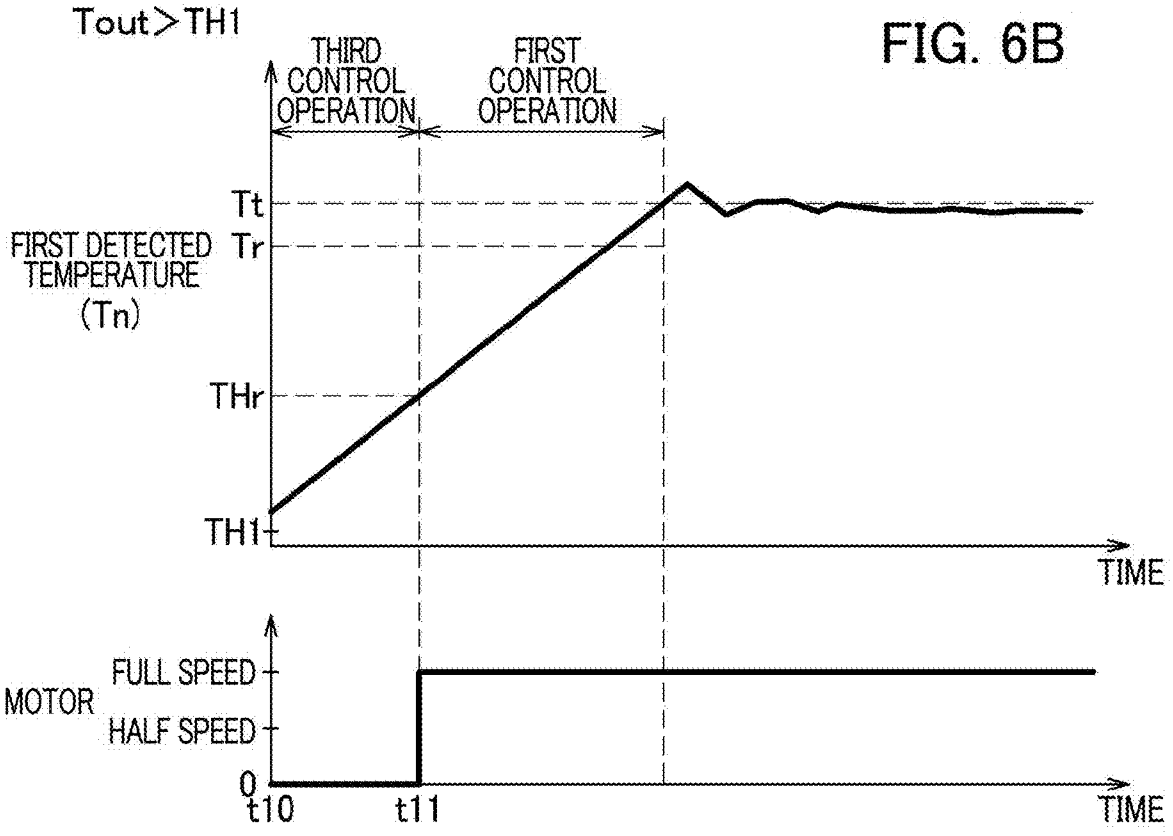
FIG. 6B is another graph illustrating the change in the first detected temperature over time until the first detected temperature has reached the target temperature, and specifically illustrating a case in which the ambient temperature at the start of driving the fixing device is higher than the first threshold.

As shown in FIG. 6B, when the control unit 500 receives print data while the ambient temperature Tout is higher than the first threshold TH1 (timing t10), the control unit 500 first performs the third control operation. As a result, the first detected temperature (Tn) rises at the first slope, which is relatively steep.

When the first detected temperature (Tn) becomes greater than or equal to the rotation starting temperature THr (timing t11), the control unit 500 switches from the third control operation to the first control operation. As a result, the first detected temperature (Tn) rises at approximately the same slope as the first slope.

The embodiment described above can obtain the following effects. The control unit 500 is configured to perform the second control operation when the second detected temperature (Tout) detected at the start of driving the fixing device 1 is lower than or equal to the first threshold TH1. Accordingly, under a low-temperature environment, output of the heater 10 is restricted and the motor M rotates at a low speed. This restriction of output from the heater 10 can suppress an irregular distribution of temperature along the circumferential direction of the belt BL (i.e., along the loop of the belt BL). As a result, the belt BL can be suppressed from deforming, thereby suppressing abnormal noise from occurring. Moreover, because the belt BL circulates at a low speed in this case, the occurrence of abnormal noise can be better suppressed than when the belt BL is circulated at a high speed.

Further, the control process can be simplified by fixing the duty cycle to the restricted value in the second control operation.

While the invention has been described in conjunction with various example structures outlined above and illustrated in the figures, various alternatives, modifications, variations, improvements, and/or substantial equivalents, whether known or that may be presently unforeseen, may become apparent to those having at least ordinary skill in the art. Accordingly, the example embodiments of the disclosure, as set forth above, are intended to be illustrative of the invention, and not limiting the invention. Various changes may be made without departing from the spirit and scope of the disclosure. Therefore, the disclosure is intended to embrace all known or later developed alternatives, modifications, variations, improvements, and/or substantial equivalents. Some specific examples of potential alternatives, modifications, or variations in the described invention are provided below.

The heating unit is not limited to the structure in the above embodiment. For example, the heating unit may include a metal plate that is heated by the heater. In this case, the belt is pressed against the metal plate by the pressure roller. In other words, the metal plate, in cooperation with the pressure roller, nips the belt between the metal plate and the pressure roller.

The first temperature sensor just needs to be configured to detect the temperature of the heating unit. For example, the first temperature sensor may be positioned apart from the heating unit.

The second temperature sensor just needs to be a different sensor from the first temperature sensor. For example, the second temperature sensor may be disposed near the fixing device.

The first rotational speed and second rotational speed are not limited to the speeds described in the embodiment but may be set to any values.

The control unit need not necessarily fix the duty cycle in the second control operation. For example, the control unit may control the heater in the second control operation so that the detected temperature of the first temperature sensor becomes no greater than a predetermined upper limit. Specifically, the control unit may perform the same control method described in the embodiment for supplying power (energization) in the second control operation after setting an upper limit. The upper limit can be set to a temperature lower than the fixing temperature and the ready temperature, for example.

The condition for switching from the second control operation to the first control operation is not limited to a temperature-based condition but may be determined based on time. For example, the control unit may switch from the second control operation to the first control operation after a first prescribed time has elapsed since the start of the second control operation.

In the first control operation, the control unit may adjust or set the duty cycle based on an operation quantity that includes the sum of a proportional term and a derivative term. The proportional term is proportional to the deviation between the first detected temperature and the target temperature, while the derivative term is proportional to the rate of change (i.e., the derivative) of this deviation. Here too, the greater the deviation between the first detected temperature and the target temperature, the higher the control unit sets the duty cycle.

In the above embodiment, the control unit selects a control operation based on the ambient temperature at the start of driving the fixing device and the temperature of the heating unit at the start of driving the fixing device. However, the control unit may select a control operation based solely on the ambient temperature at the start of driving the fixing device, for example. In this case, the control unit may execute the second control operation when the ambient temperature at the start of driving the fixing device is no greater than the first threshold and may execute the first control operation when the ambient temperature at the start of driving the fixing device is higher than the first threshold. Further, the control unit may be configured not to execute the fourth control operation in this case.

The third control operation is also optional and need not necessarily be executed. In this case, the control unit may initially execute one of the first control operation and second control operation based on the ambient temperature at the start of driving the fixing device.

The image forming apparatus is not limited to a laser printer but may be another image forming apparatus, such as a copier or multifunction peripheral.

The elements described in the above embodiment and variations may be implemented in any combination.

What is claimed is:

1. An image forming apparatus comprising:
a fixing device comprising:
a heating unit comprising a heater;
an endless belt;
a pressure roller configured to, in cooperation with the heating unit, nip the endless belt between the pressure roller and the heating unit; and
a first temperature sensor configured to detect a temperature of the heating unit;
a motor for rotating the pressure roller;
a second temperature sensor different from the first temperature sensor; and
a controller configured to perform driving the fixing device, the driving the fixing device including a heating process to raise the temperature of the heating unit to a target temperature,
wherein the controller is further configured to perform, during the heating process:
a first control operation in which the controller rotates the motor at a first rotational speed and adjusts a duty cycle of electric power supplied to the heater to a higher value as a deviation between the target temperature and a temperature detected by the first temperature sensor becomes greater; and
a second control operation in which the controller rotates the motor at a second rotational speed lower than the first rotational speed and restricts the duty cycle within a range lower than or equal to a restricted value, the restricted value being lower than an upper limit of the duty cycle in the first control operation, and
wherein the controller is further configured to perform the second control operation when a temperature detected by the second temperature sensor at a start of the driving the fixing device is lower than or equal to a first threshold.

2. The image forming apparatus according to claim 1, wherein the controller is further configured to fix the duty cycle at the restricted value in the second control operation.

3. The image forming apparatus according to claim 1, wherein the controller is further configured to perform the first control operation without performing the second control operation when the temperature detected by the second temperature sensor at the start of the driving the fixing device is higher than the first threshold.

4. The image forming apparatus according to claim 1, wherein the controller is further configured to switch from the second control operation to the first control operation when the temperature detected by the first temperature sensor becomes higher than or equal to a second threshold during the second control operation, the second threshold being lower than the target temperature.

5. The image forming apparatus according to claim 1, wherein the controller is further configured to perform, during the heating process:
a third control operation in which the controller supplies the electric power to the heater while the motor is in a halted state,
wherein the controller is further configured to start the third control operation at the start of the driving the fixing device, and
wherein the controller is further configured to start, after ending the third control operation:
the first control operation when the temperature detected by the second temperature sensor at the start of the driving the fixing device is lower than or equal to the first threshold; and
the second control operation when the temperature detected by the second temperature sensor at the start of the driving the fixing device is higher than the first threshold.

6. The image forming apparatus according to claim 1, wherein the controller is further configured to perform, during the heating process:

a fourth control operation in which the controller rotates the motor at the second rotational speed and adjusts the duty cycle to a higher value as the deviation between the target temperature and the temperature detected by the first temperature sensor becomes greater, and wherein the controller is further configured to perform:

the second control operation when the temperature detected by the second temperature sensor at the start of the driving the fixing device is lower than or equal to the first threshold and the temperature detected by the first temperature sensor at the start of the driving the fixing device is lower than a third threshold; and the fourth control operation when the temperature detected by the second temperature sensor at the start of the driving the fixing device is lower than or equal to the first threshold and the temperature detected by the first temperature sensor at the start of the driving the fixing device is higher than or equal to the third threshold.

7. The image forming apparatus according to claim 1, wherein the controller is further configured to start the driving the fixing device in response to receiving print data.

8. The image forming apparatus according to claim 1, wherein the controller is further configured to start the driving the fixing device in response to a power to the image forming apparatus being turned on.

9. The image forming apparatus according to claim 1, wherein the controller is further configured to start the driving the fixing device in response to a status of the image forming apparatus returning from an error condition to a normal condition.

10. The image forming apparatus according to claim 1, wherein the controller is further configured to start the driving the fixing device in response to a status of the image forming apparatus transitioning from a sleep mode to a ready mode.

* * * * *